United States Patent [19]
de Montigny et al.

[11] 4,202,929
[45] May 13, 1980

[54] PRODUCTION OF NON-STICK COATINGS

[75] Inventors: Armand de Montigny; Hans Toepsch; Werner Büchner, all of Leverkusen, Fed. Rep. of Germany

[73] Assignee: Bayer Atkiengesellschaft, Leverkusen, Fed. Rep. of Germany

[21] Appl. No.: 949,316

[22] Filed: Oct. 6, 1978

[30] Foreign Application Priority Data

Oct. 28, 1977 [DE] Fed. Rep. of Germany ....... 2748421

[51] Int. Cl.$^2$ .......................... C08G 47/02; B32B 9/04
[52] U.S. Cl. .................................... 428/452; 427/387; 428/447; 428/537; 528/28; 528/31; 528/33; 528/34; 528/901
[58] Field of Search ............... 428/447, 452, 537, 352; 528/33, 34, 31, 28, 901; 260/825; 427/387

[56] References Cited

U.S. PATENT DOCUMENTS

| 3,385,727 | 5/1968 | Thomas | 428/447 |
| 3,518,325 | 6/1970 | Campbell | 428/452 |
| 3,649,349 | 3/1972 | Grenoble | 428/447 |
| 3,749,593 | 7/1973 | Keiser | 428/447 |
| 3,849,359 | 11/1974 | Nitzsche | 428/447 |
| 4,020,761 | 5/1977 | Ogiwara | 428/447 |

FOREIGN PATENT DOCUMENTS 1111156 4/1968 United Kingdom .
1181347 2/1970 United Kingdom .
1342229 1/1974 United Kingdom .

Primary Examiner—Ellis P. Robinson
Attorney, Agent, or Firm—Sprung, Felfe, Horn, Lynch & Kramer

[57] ABSTRACT

In the production of non-adherent coated paper substrate by applying to the substrate a solvent-containing mixture comprising (A) an α,ω-polyorganosiloxanediol, (B) an organosiloxane containing Si-H groups, (C) an alkyl- or alkenyl-triacetoxysiloxane, (D) an organic isocyanate with more than two isocyanate radicals and (E) a hardening catalyst, and then heating the substrate to harden the coating, the improvement which comprises including in the mixture applied to the substrate a reaction product (F) of a chloromethylpolymethylsiloxane of the formula

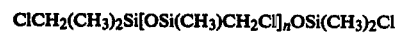

$ClCH_2(CH_3)_2Si[OSi(CH_3)CH_2Cl]_nOSi(CH_3)_2Cl$ wherein n is from 2 - about 200, with at most an equivalent molar amount of a primary alkyl, alkenyl or cycloalkyl amine with about 4–18 carbon atoms, e.g. butylamine, hexylamine, cyclohexylamine, 2-ethylhexylamine and allylamine. The coating hardens in a very short time in a drying oven but at normal temperatures the mass has a relatively long pot life.

3 Claims, No Drawings

PRODUCTION OF NON-STICK COATINGS

The present invention relates to a process for providing thin substrates with an adhesion-reducing finish by means of organopolysiloxane coatings.

It is known that surfaces of paper or other solid substances can be coated with organopolysiloxanes in order to prevent sticky substances from adhering firmly to these surfaces (compare, for example, W. Noll, "Chemie and Technologie der Silicone" ("Chemistry and Technology of Silicones"), Weinheim 1968, page 520/521 and British Pat. No. 1,111,156).

However, ever higher demands are made on the processes for the production of non-stick coatings based on polysiloxane. Coating processes are required which are able to lead to completely hardened coatings after very short heating times, that is to say at high machine speeds, without these properties being paid for by other disadvantages. Thus, an extremely short hardening time in drying tunnel should not lead to a drastic reduction in the residence time in the application system, which should be at least 8 hours at room temperature.

It would therefore be desirable for coating systems which react very rapidly at the operating temperatures to have a processing time of considerably more than 8 hours at room temperature. It would be ideal if the processing time were restricted only by the evaporation of the solvent present and not by gelling or in some cases by inactivation of the mixture.

Processes with relatively high rates of hardening, coupled with a sufficiently long pot life, are known. However, the high rate is achieved in the processes of the state of the art by the hardening temperatures being relatively high, and the minimum temperature at which economic rates are possible and at which reliably hardened coatings are present would be, in the most favorable case, about 130° C.±5° C. These temperatures restrict, of course, the number of substrates which can be coated. Thus, for example, sheets of materials which tolerate temperatures of at most 100° C. cannot be coated. Such sheets can only be coated using the coating agents of the processes of the state of the art if hardening times of 60 seconds and more are accepted and, in some cases, a coating which is initially still not completely hardened is tolerated.

A composition is known, for example, from U.S. Pat. No. 3,385,727, the hardening of which is based on the reaction of alkyltriacyloxysilanes with α,ω-polyorganosiloxanediols in the presence of organic tin compounds. As the corresponding examples show, the hardening times are on the order of 60 seconds.

According to DT-OS (German Published Specification) No. 2,135,673, the addition of organic isocyanates with more than two isocyanate types indeed leads to particularly well-hardened coatings, but the hardening time is not reduced to the desired extent. A process has been disclosed in British Pat. No. 1,181,347, in which the crosslinking of the polyorganosiloxanediol is carried out by means of a mixture of methyl-hydridopolysiloxane and a silicate with monoalkyl glycol ether groups which can be split off, in the presence of an organic isocyanate with more than two isocyanate groups which is soluble in organic solvents. In this case also, the rate of hardening is inadequate (Example 6). As can be seen from Example No. 5 of British Pat. No. 1,181,347, the pot life is furthermore completely insufficient, if the assumption is made that the possible processing time should be at least the period of a working shift, that is to say 8 hours. Even longer times are frequently desirable.

The present invention thus relates to a process for the production of adhesion-reducing coatings on thin substrates by applying a solvent-containing mixture consisting of (A) α,ω-polyorganosiloxanediols, (B) Si-H-containing organosiloxanes, (C) alkyl- or alkenyl-triacetoxysilanes, (D) organic isocyanates with more than two isocyanate radicals and (E) hardening catalysts, characterized in that before hardening, the reaction product (F) of a chloromethylpolymethylsiloxane of the formula $ClCH_2(CH_3)_2Si[OSi(CH_3)CH_2Cl]_nOSi(CH_3)_2CH_2Cl$ 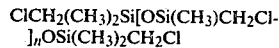

wherein n denotes a value from 2-200, with at most equivalent amounts of a primary amine, the organic radical of which consists of an alkyl or cycloalkyl radical with 4-18 C atoms, is added to the mixture.

The process according to the invention does not have the abovementioned disadvantages. The astonishingly short hardening times at 80° C. are not obtained at the expense of the quality of the film, which possesses outstanding hardness and is resistant, for example, towards organic solvents present in commercial adhesives. Likewise, they are not obtained at the expense of the processing times, which vary between 24 hours and 48 hours depending on the concentration of the components, without organic ketones having to be present.

Above all, it could not be foreseen that the particular qualitative characteristics are achieved by adding a morpholine component, since a component of this type, starting with the preparation of the mixture, should certainly be completely neutralized by the acid groups of the crosslinking agent (c).

However, the use of the process according to the invention is not confined only to coating operations at temperatures below about 100° C. At the temperatures of about 150° to 200° C. possible in modern coating installations, extremely short hardening times are achieved which frequently correspond to several times the rate of hardening of systems used in processes of the state of the art.

The α,ω-polyorganosiloxanediols employed according to the invention, which preferably carry exclusively methyl radicals, are known. They have a viscosity of about $10^5$ to $10^7$ cP at 20° C., these viscosities being adjusted by admixture, if necessary. The hydrogen-containing methylsiloxanes, which preferably have a linear structure and are blocked on both ends by trimethylsiloxy groups, are likewise known. Compounds with about 10 to 50 $CH_3Si(H)O$ units are preferred. They are employed in amounts of about 0.3 to 20 percent by weight, relative to the polyorganosiloxanediol present.

The alkyl- or alkenyl-triacetoxysilanes employed are used in amounts of about 8 to 20, preferably about 12 to 16, percent by weight, relative to (A). They are known, for example, from DT-OS (German Published Specification) No. 2,135,673. The alkyl or alkenyl radicals preferably have up to 4 carbon atoms. Vinyltriacetoxysilane is preferably employed.

The organic polyisocyanates are also known (compare, for example, DT-OS (German Published Specification No. 2,135,673). About 6 to 35 percent by weight, relative to (A), are employed. The heavy metal carboxylates or dialkyl-tin carboxylates, which are likewise known as hardening catalysts, are, for example, dibutyl-tin diacetate, tin octoate and dibutyl-tin dilaurate. The amounts in which they are employed are about 1 to 20 percent by weight, relative to (A), preferably about 2 to 8%. Dibutyl-tin diacetate is preferably employed.

The aminosiloxane employed according to the invention is a reaction product of a chloromethylpolysiloxane of the formula

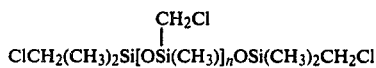

wherein n denotes a number from 2 to about 200, preferably 4 to about 100, with at most equivalent amounts of an organic primary amine, in which the organic radical is a linear, e.g. alkyl or alkenyl, or cyclic aliphatic radical with about 4 to 18 C atoms.

The type of primary organic amines is determined less by their chemical properties than by their availability and their handling possibilities, physiological properties and the like.

Examples of suitable compounds are: butylamine, hexylamine, cyclohexylamine, 2-ethylhexylamine and allylamine.

The chloromethylchlorosilanes are converted into the desired chloromethylsiloxanes by cohydrolysis and subsequent acid equilibration. The reaction with amines takes place in an organic solvent, such as, for example, toluene, xylene or benzene. Care is taken that at most equivalent amounts of amine are used in the reaction. Disilamorpholine structures are thereby preferentially formed, so that, depending on the amount of amine added, groupings of the formula

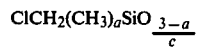

wherein A=1 or 2 and of the formula

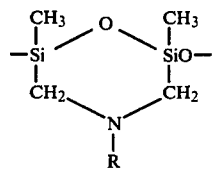

wherein R is defined by the statements made earlier, are present. However, at least about 20%, preferably about 30-80%, of the chloromethylsiloxy units should be reacted.

The amounts of reaction product employed are about 0.5–10 percent by weight, relative to (A), preferably about 1 to 5% by weight.

The mixtures are applied by the customary processes, for example by dipping, roller-coating, spraying, brushing, pouring and the like, to the substrates whose adhesiveness is to be reduced. The hardening takes place between about 80° and 200° C., depending on the nature of the substrate.

The process according to the invention will now be illustrated in still further detail with the aid of the examples which follow (% data are % by weight).

EXAMPLES

Example A (a) Preparation of

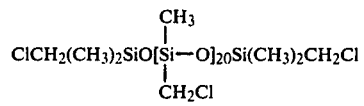

A mixture of 129 g [0.9 mol] of ClCH₂(CH₃)₂SiCl and 1,471 g [9 mols] of ClCH₂(CH₃)SiCl₂ is introduced into 3,600 g of H₂O, while stirring, taking care that during the addition the temperature does not rise substantially above 30° C. When the addition is complete, the mixture is stirred for a further hour. The aqueous phase is separated off from the hydrolysis product and discarded.

The siloxane phase is dried and then equilibrated at 150° C. for 5 hours (3% of bleaching earth).

Yield: 894 g; $n_D^{20}$: 1.4689; % of Cl: 32.6%.

(b) Preparation of the disilamorpholinesiloxane 432 g of the above chloromethylsiloxane [3.97 g equivalents of chlorine] are mixed with 1,800 g of dried toluene and the mixture is heated to 60° C. A mixture of 1,212 g [12.00 mols] of triethylamine, 196.4 g [1.984 mols] of cyclohexylamine and 1,200 g of toluene is added dropwise to this solution in the course of 120 minutes. When the addition is complete, the mixture is stirred at 60° C. for 2 hours, cooled and filtered. The filtrate is then concentrated to 110° C., so that an approximately 28–30% strength solution in toluene is formed. After it has been cooled, the mixture is filtered over a filtration auxiliary.

Yield: 1,600 g of an approximately 28% strength siloxane solution in toluene.

The N analysis of the product, freed from solvent, gives the following values: % of basic N: 3.08; % of primary N: 0.01; % of secondary N: 0.26; and % of tertiary N: 2.82.

The disilamorpholine structure is confirmed by IR spectroscopy. The 28% strength solution was employed in each of the following examples, with the exception of Example 3.

Example 1

20 g of α,ω-dihydroxypolydimethylsiloxane with a viscosity of $10^7$ cP at 20° C. are dissolved in 80 g of toluene, and 1.5 g of a methyl-hydridosiloxane terminally blocked with trimethylsiloxy and having about 30 CH₃Si(H)O units are added.

300 g of toluene, 2.8 g of vinyltriacetoxysilane, 0.9 g of the disilamorpholinesiloxane solution from Example A and 1.6 g of dibutyl-tin diacetate are added to this mixture, while stirring. 7.5 g of an approximately 30% strength solution of N,N'-N'',-tris-(6-isocyanatohexyl)-biuret in toluene is then admixed, with further stirring.

Using this solution, a number of coatings were carried out in a drying oven which has no device for internal air circulation.

| Time [hours] | Temperature [°C.] | Time B [seconds] | Substrate | Doctor blade [No.] | Hardening | Resistance to solvents |
| --- | --- | --- | --- | --- | --- | --- |
| 0 | 85 | 15 | Paper | 30 | + | + |
| 1 | " | " | " | " | + | + |
| 2 | " | " | " | " | + | + |
| 3 | " | " | " | " | + | + |
| 4 | " | " | " | " | + | + |
| 5 | " | " | " | " | + | + |
| 10 | " | " | " | " | + | + |

Experimental Series 2

| Time A [hours] | Temperature [°C.] | Time B [seconds] | Substrate | Doctor blade [No.] | Hardening | Resistance to solvents |
| --- | --- | --- | --- | --- | --- | --- |
| 0 | 150 | 7 | Paper | 30 | + | + |
| 1 | " | " | " | " | + | + |
| 2 | " | " | " | " | + | + |
| 3 | " | " | " | " | + | + |
| 4 | " | " | " | " | + | + |
| 5 | " | " | " | " | + | + |
| 10 | " | " | " | " | + | + |

Experimental Series 3

| Time A [hours] | Temperature [°C.] | Time B [seconds] | Substrate | Doctor blade [No.] | Hardening | Resistance to solvents |
| --- | --- | --- | --- | --- | --- | --- |
| 0 | 150 | 7 | Paper | 50 | + | + |
| 10 | " | " | " | " | + | + |

Experimental Series 4

| Time A [hours] | Temperature [°C.] | Time B [seconds] | Substrate | Doctor blade [No.] | Hardening | Resistance to solvents |
| --- | --- | --- | --- | --- | --- | --- |
| 0 | 85 | 15 | Polyethylene film | 30 | + | + |
| 1 | " | " | Polyethylene film | " | + | + |
| 2 | " | " | Polyethylene film | " | + | + |
| 3 | " | " | Polyethylene film | " | + | + |
| 4 | " | " | Polyethylene film | " | + | + |
| 5 | " | " | Polyethylene film | " | + | + |
| 10 | " | " | Polyethylene film | " | + | + |

Time A: Period from the point in time of the preparation of the mixture to its application.

Time B: Hardening time

Doctor blade: In order to provide information on the hardening under more difficult conditions, large amounts of the mixture were applied to the substrate with a No. 50 doctor blade.

Hardening: The hardening was tested 15 seconds after the coated material had left the oven, by vigorous rubbing with the fingertip. If the slightest marks could be detected (control viewed against the light), the assessment was negative.

Resistance to solvents: The resistance to solvents was tested by rubbing with a pad of cottonwool impregnated with ethyl acetate. In the case of films which are not resistant to solvents, streaks which can be stained by an alcoholic rhodamine solution are formed by repeated rubbing (10 times) under a pressure of about 150–200 ponds (check on scales if appropriate). This rapid test was carried out within 15 minutes after the material had left the drying oven.

Example 2

The solution prepared in Example 1 was compared with a mixture prepared according to Example 3 (DT-OS (German Published Specification) 2,135,673):

| Time A [hours] | Temperature | Time B | Substrate | Hardening | Product |
| --- | --- | --- | --- | --- | --- |
| 0 | 150 | 7 | Paper | + | Example 1 |
| 0 | 150 | 7 | " | – | Example 3 |
| 0 | 150 | 10 | " | – | Example 3 |
| 0 | 150 | 15 | " | + | Example 3 |
| 1 | 85 | 15 | " | + | Example 1 |
| 1 | 85 | 15 | " | – | Example 3 |
| 1 | 90 | 30 | " | – | Example 3 |
| 1 | 90 | 60 | " | – | Example 3 |

Example 3

The mixture prepared in Example 1 is repeated, with the exception that a product (a) containing 1.56% of tertiary N and (b) containing 2.64% of tertiary N is used as the disilamorpholinesiloxane. For both (a) and (b) the following data apply:

| Time A | Temperature | Time B | Substrate | Hardening | Resistance to solvents |
| --- | --- | --- | --- | --- | --- |
| 0 | 85 | 15 | paper | + | 30 |
| 8 | 85 | 15 | paper | + | + |

Example 4

(a) 50 kg of a mixture according to Example 1 were applied to "Corona-pretreated" HD polyethylene film in a coating machine with the aid of a reverse coating roll. The drying tunnel temperature was 85° C. After a residence time of 10 seconds in the tunnel, the siloxane film was hardened to the point such that it was smudge-resistant.

The resistance to solvents was tested as described in Example 1, except that the test was carried out after only 10 minutes' open storage. The results were positive.

(b) In a further machine experiment, the above mixture was modified so that the amount of N,N,N''-tris-(6-isocyanatohexyl)-biuret employed was increased by ⅓. The siloxane film was completely resistant to the solvent ethyl acetate immediately after leaving the drying tunnel.

The peel strengths, tested with Tesaband 659 (manufacturer: Messrs. Beiersdorf AG), were 2–4 g/cm of strip width. These values apply both to measurements on freshly siliconized films (start of testing immediately after leaving the drying tunnel) and to measurements which were carried out after storage of the films for 4 days.

Parallel experiments with a conventional silicone coating agent gave, in tests which were carried out immediately after leaving the drying tunnel, values which were at least five times higher. Tests which were carried out after storage for 4 days gave values which varied from 2 to 4 g/cm of strip width. In addition, smudge-resistant hardening necessitated a longer residence time in the drying tunnel.

The reduction in adhesion of the Tesaband 659 under storage for 7 days under pressure at 60° C. in contact with the film which had been siliconized according to (b) was less than 6%.

It will be appreciated that the instant specification and examples are set forth by way of illustration and not limitation, and that various modifications and changes may be made without departing from the spirit and scope of the present invention.

What is claimed is:

1. In the production of a coated thin substrate having a reduced tendency to adhere by applying to the substrate a solvent-containing mixture comprising (A) an α,ω-polyorganosiloxanediol, (B) an organosiloxane containing Si-H groups, (C) an alkyl- or alkenyl-triacetoxysiloxane, (D) an organic isocyanate with more than two isocyanate radicals and (E) a hardening catalyst, and then heating the substrate to harden the coating, the improvement which comprises including in the mixture applied to the substrate a reaction product (F) of a chloromethylpolymethylsiloxane of the formula

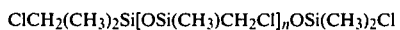

wherein n is from 2–about 200, with at most an equivalent molar amount of a primary alkyl, alkenyl or cycloalkyl amine with about 4–18 carbon atoms.

2. A process according to claim 1, wherein the amine for the preparation of the reaction product (F) is cyclohexylamine.

3. Coated paper produced according to claim 1.

* * * * *